Oct. 22, 1935.        W. H. SCHULZE        2,018,153
VACUUM PUMP
Filed Jan. 21, 1932         2 Sheets-Sheet 1
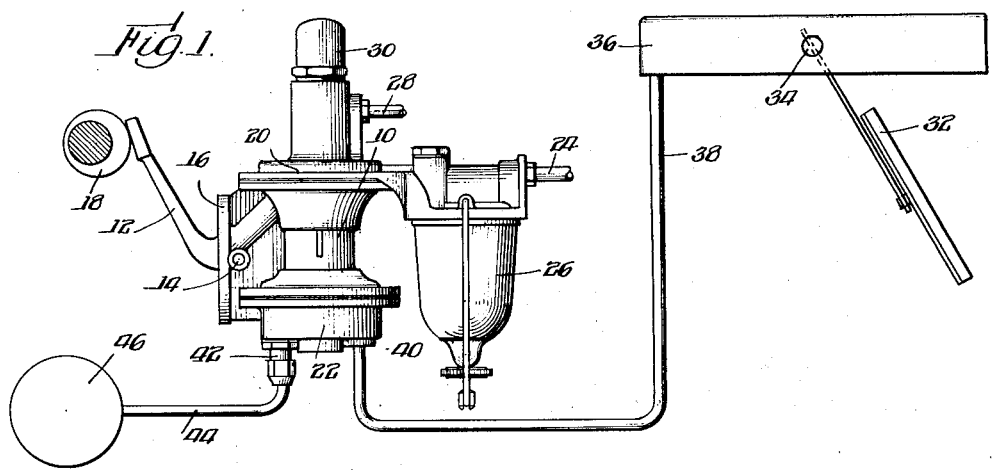
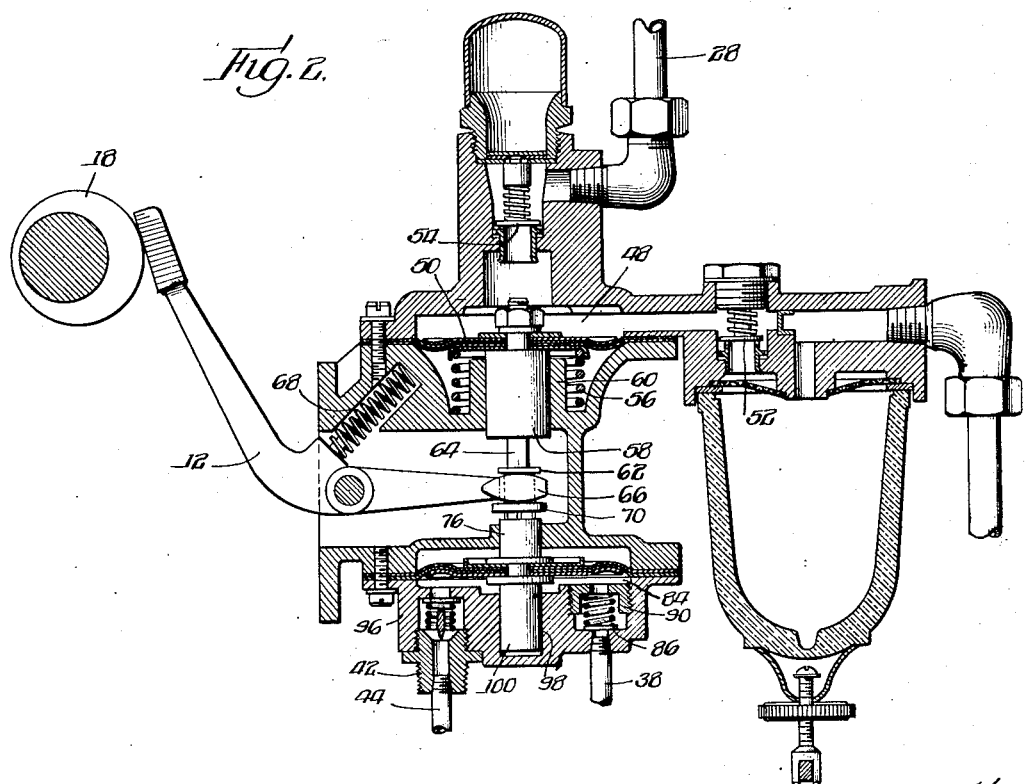

Oct. 22, 1935.     W. H. SCHULZE     2,018,153
VACUUM PUMP
Filed Jan. 21, 1932     2 Sheets-Sheet 2
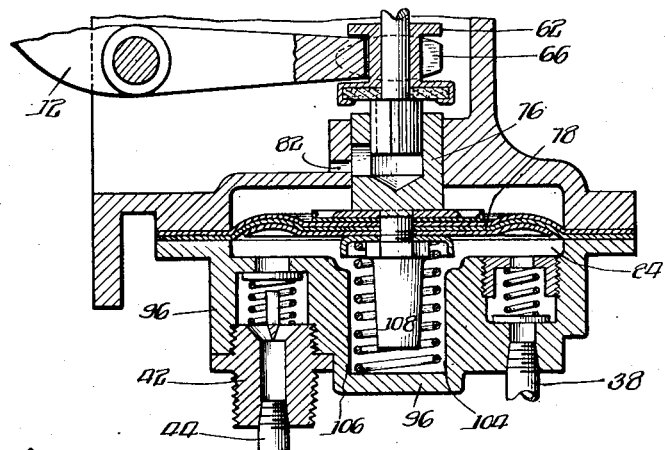
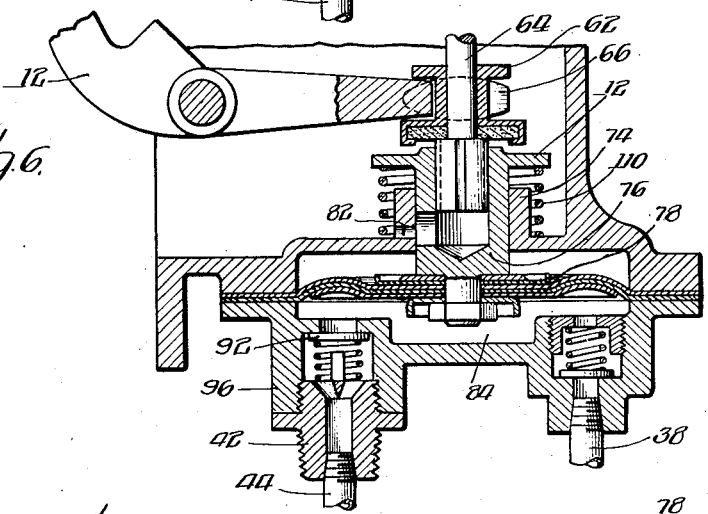
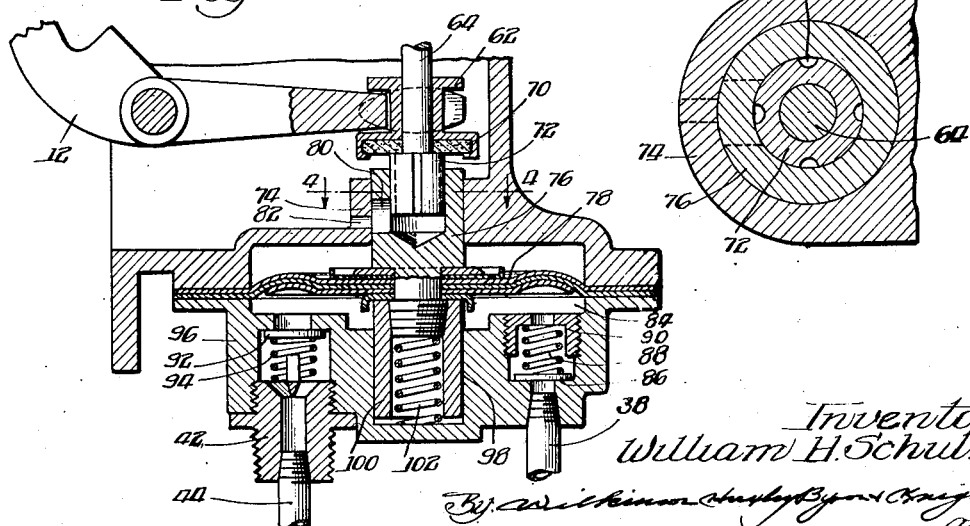
Inventor:
William H. Schulze Patented Oct. 22, 1935

2,018,153

UNITED STATES PATENT OFFICE 2,018,153

VACUUM PUMP

William H. Schulze, Chicago, Ill., assignor, by mesne assignments, to General Motors Corporation, Detroit, Mich., a corporation of Delaware Application January 21, 1932, Serial No. 587,857

3 Claims. (Cl. 230—38)

This invention relates to improvements in a combined fuel pump and vacuum pump booster adapted for use in association with motor vehicles.

There has been developed a fuel pump for feeding fuel from a supply tank to the carburetor of an engine consisting of a pump casing adapted for mounting on the engine casing to derive actuation from an engine-driven element within the engine casing and including a diaphragm pumping element having a resiliently variable discharge stroke. It has also been common practice to operate the windshield wiper or other devices of the vehicle by vacuum pressure derived from the intake manifold. It is well known that it is impossible to maintain regularity of operation of the windshield wiper or other devices when the intake manifold vacuum alone is utilized, since the manifold vacuum varies in accordance with the load and speed of the engine.

According to the present invention, it is proposed to combine a vacuum pump booster with the fuel pump whereby the vacuum pump is operated by the same element which drives the fuel pump and assists in maintaining regular operation of the windshield wiper or other devices by building up vacuum pressure when the intake manifold pressure is insufficient.

It is a purpose of the present invention to mount the vacuum pump on the lower side of the casing which serves as a mounting for the fuel pump and a desirable feature of the present invention consists in positioning the vacuum pump concentric with the fuel pump.

By mounting the vacuum pump concentric with the fuel pump it is possible to slidably associate the respective stems for the pumping diaphragms of the fuel and vacuum pumps and to operate both the stems from a single pick-up member slidably associated with one of the stems.

It is also a feature of the present invention that the diaphragm or piston of the vacuum pump has a resiliently variable suction stroke in distinction to the resiliently variable discharge strokes of the diaphragm for the fuel pump and that both pumps are operated by a constant stroke lever carried by the pump casing which is driven from the engine. Thus the pumps will be actuated in accordance with the demands for fuel or vacuum pressure while the lever continues to move with a constant stroke.

Further and additional objects and advantages of the present improvements will be more readily apparent from the following description taken in connection with the attached drawings, in which—

Figure 1 is a diagrammatic installation of a combined fuel pump and vacuum pump for operating a windshield wiper;

Figure 2 is a vertical section taken through the combined pumps;

Figure 3 is a detail section of the vacuum pump;

Figure 4 is a detail section taken on the plane 4—4 in Figure 3;

Figure 5 is a detail section of a modification of the vacuum pump, and

Figure 6 is a detail section illustrating a further modification of the vacuum pump.

In Figure 1 there is shown pumping mechanism included in a casing, generally indicated 10, operated by a lever 12 carried by pivot 14. The casing has a flange 16 for mounting on an engine casing and the lever 12 is adapted to extend into the engine casing for thrust engagement with an engine-driven cam 18. The casing 10 includes a fuel pump 20 and a vacuum pump 22. The fuel pump has an inlet connection 24 to the fuel receiving chamber 26 from a source of fuel supply and an outlet connection 28 from the vapor dome pressure chamber 30 of the fuel pump and leading to the carburetor of the engine. A windshield wiper arm 32 is operated by oscillating shaft 34. The wiper casing 36 has mechanism for operating the shaft 34 in the desired manner through the vacuum pressure derived through pipe 38 which leads to the inlet connection 40 of the vacuum pump 22. The outlet connection 42 of the vacuum pump is connected by a pipe 44 to the intake manifold 46 of the engine.

The internal construction of the casing 10 is more clearly disclosed in Figures 2 and 3 in which there is a fuel pumping chamber 48, which is expanded and reduced by the movement of a reciprocable pumping diaphragm 50. A spring pressed inlet valve 52 controls the entrance of fuel into the pumping chamber and prevents back flow and a spring-pressed outlet check valve 54 controls the delivery of fuel to the outlet pipe line 28. The pumping diaphragm 50 is urged for its discharge stroke by a compression spring 56 in the usual manner. A reciprocable stem 58 connected to the diaphragm 50 is guided by the boss 60 of the casing 10 and is moved in a downward direction for a suction stroke of the pumping diaphragm 50 through means of a collar 62 slidable on the reduced lower end 64 of the stem 58 and engaged by the yoke-shaped end 66 of the lever 12. The lever 12 is maintained in thrust engagement with the engine-driven cam 18 by means of a follower spring 68. The spool 62 has clamped to its lower end a cushion abutment 70 which is adapted to engage a shouldered abutment 72 on the lower end of the reduced portion 64 of the stem 58. Thus, if the force of the spring 56 is insufficient to move the pumping diaphragm for its discharge stroke, lost motion will occur between the spool 62 and the shouldered abutment 72.

The casing 10 has a bearing 74 for a cup-shaped stem 76 which is secured to the center of the reciprocable vacuum pump diaphragm 78. The abutment 72 on the lower end of the pump stem 58 is slidable in the stem 76, as shown in Figure 3 and is provided with grooves 78 for lubricating the bearing. The cup-shaped stem 76 has a slotted opening 80 cooperating with the opening 82 in the fixed guide bearing portion 74 to permit flow of lubricant from the cavity of the casing 10 into the bearings for the slidable stems.

An expansible and reducible vacuum pump chamber 84, of which the diaphragm 78 forms a movable wall, has an inlet check valve 86 held in normal seated position by a spring 88 retained in place by the threaded plug 90 and an outlet check valve 92 held in normal seated position by spring 94, retained by the threaded outlet connection 42. The removable head 96 of the vacuum pump, which contains the inlet and outlet check valves has a guide bearing 98 for a sleeve 100 secured to the reciprocable stem 76 of the pumping diaphragm. A spring 102, reacting between the head 96 and the stem 76, serves to move the diaphragm 78 in a suction direction, the diaphragm 78 being moved in a discharge direction by the operation of lever 12.

As shown in Figure 5 the guiding sleeve 100 may not be used. Instead, a spring 104 may be employed reacting between the cup-shaped portion 106 of the head 96 and the diaphragm. The space within the cup-shaped portion which receives the spring 104 is materially reduced by an enlarged head 108 forming a nut member for securing the stem 76 to the diaphragm 78.

In Figure 6 another modification is disclosed in which a spring 110, for producing the suction stroke of the diaphragm 78, is arranged surrounding the guide bearing 74 of the casing and reacts upon a flange 112 integral with the stem 76. In this form the capacity of the pumping chamber 84 may be materially reduced.

By combining a fuel pump and vacuum pump in this manner it is possible to operate both pumps by a common engine-driven lever. Both pumps may be operated with a variable stroke, that is, the fuel pump will not deliver fuel above a discharge pressure determined by the force of the spring 56 and, in a similar manner, the vacuum pump will not operate for suction unless the spring, which reacts upon the diaphragm 78 is strong enough to move the diaphragm in a suction direction against the vacuum condition existing in the intake manifold of the engine and conduit. Therefore, as long as sufficient suction is being created from the intake manifold, the diaphragm 78 will be maintained inoperative and the air will be exhausted through the pipe line 24 into the pumping chamber 84 and into the intake manifold. If the depression in the intake manifold becomes insufficient, the spring acting upon the diaphragm 78 will then expand and move the diaphragm 78 for a suction stroke and movement of the lever 12 will then pick up the stem 76 and move the diaphragm 78 in a discharge direction.

I claim:

1. In a pumping device, a casing having an expansible and reducible pumping chamber, a pumping member forming a movable wall of said pumping chamber, a stem secured to said pumping member, a spring reacting between said casing and said stem to move said pumping member in a direction to expand said pumping chamber, said stem having a socketed opening formed therein, a second stem member slidably fitted in the socketed opening of said first stem member, a pick-up member supported by said second stem, said first-mentioned stem having an abutment face adapted for engagement by said pick-up member when said pick-up member is moved in one direction and a pivoted operating lever carried by said pump casing for imparting a constant stroke of movement to said pick-up member whereby said pumping member is moved for reduction of said pumping chamber through actuation of said pick-up member.

2. In a pumping device of the class described, a casing having a pumping chamber therein, a reciprocable pumping member cooperating with said pumping chamber, resilient means for moving said pumping member in a direction to enlarge said pumping chamber, said resilient means positioned with its axis coincident with the axis of movement of the central portion of the pumping member, a stem disposed in said casing concentric with the axis of said pumping member, a spool-shaped pick-up member supported by said stem and adapted to transmit movement to said pumping member against the resistance of said resilient means by thrust engagement therewith and a cam-actuated lever pivotally supported by said casing having a yoke-shaped end in operative engagement with said spool-shaped member.

3. In a pumping device of the class described, a casing having a pumping chamber therein, a reciprocable member cooperating with said pumping chamber, resilient means for moving said pumping member in a direction to enlarge said pumping chamber, a stem fixed to said pumping member, a spool-shaped pick-up member supported for reciprocable movement with respect to said casing, a cushion abutment carried by said pick-up member and adapted to contact said stem and a cam actuated lever pivotally supported by said casing having a yoke-shaped end in operative engagement with said pick-up member to transmit positive movement to said pumping member.

W. H. SCHULZE.